United States Patent [19]
Okino et al.

[11] Patent Number: 5,917,577
[45] Date of Patent: Jun. 29, 1999

[54] IMAGE EXPOSING DEVICE

[75] Inventors: Yoshiharu Okino; Toshiro Hayakawa, both of Ashigarakami-gun; Takuya Yokokawa, Minami-Ashigara, all of Japan

[73] Assignee: Fuji Photo Film Co., Ltd., Kanagawa, Japan

[21] Appl. No.: 08/971,296

[22] Filed: Nov. 17, 1997

[30] Foreign Application Priority Data

Nov. 15, 1996 [JP] Japan .................................. 8-305243

[51] Int. Cl.$^6$ ............................. G03B 27/32; G03B 27/72
[52] U.S. Cl. ............................................... 355/32; 355/35
[58] Field of Search ................................. 355/32, 27, 35, 355/37, 40; 430/505, 6, 394, 584, 567; 369/112, 110

[56] References Cited

U.S. PATENT DOCUMENTS

| 5,415,978 | 5/1995 | Asami et al. | 430/363 |
|---|---|---|---|
| 5,496,689 | 3/1996 | Ogawa | 430/505 |
| 5,508,161 | 4/1996 | Miyake et al. | 430/574 |
| 5,573,894 | 11/1996 | Kodama et al. | 430/394 |

FOREIGN PATENT DOCUMENTS 7-219185  8/1995  Japan .............................. G03C 8/40

*Primary Examiner*—Eddie C. Lee
*Assistant Examiner*—Hung Henry Nguyen
*Attorney, Agent, or Firm*—Sughrue, Mion, Zinn, Macpeak & Seas, PLLC

[57] ABSTRACT

An image exposing device which, on the basis of image data, modulates light beams outputted from three light sources having respectively different wavelengths, and which scans/exposes the light beams onto a photosensitive material. The three light sources includes a first light source having a light-emitting peak wavelength in a vicinity of 635 nm, a second light source having a light-emitting peak wavelength in a range of 670 to 710 nm, and a third light source having a light-emitting peak wavelength in a vicinity of 780 nm. The photosensitive material includes a first photosensitive layer having a peak spectral sensitivity corresponding to the first light source, a second photosensitive layer having a peak spectral sensitivity corresponding to the second light source, and a third photosensitive layer having a peak spectral sensitivity corresponding to the third light source. A sensitivity of the first photosensitive layer with respect to the first light source is at least fifteen times a sensitivity of the second photosensitive layer with respect to the first light source, and a sensitivity of the second photosensitive layer with respect to the second light source is at least fifteen times a sensitivity of the first photosensitive layer with respect to the second light source.

8 Claims, 3 Drawing Sheets

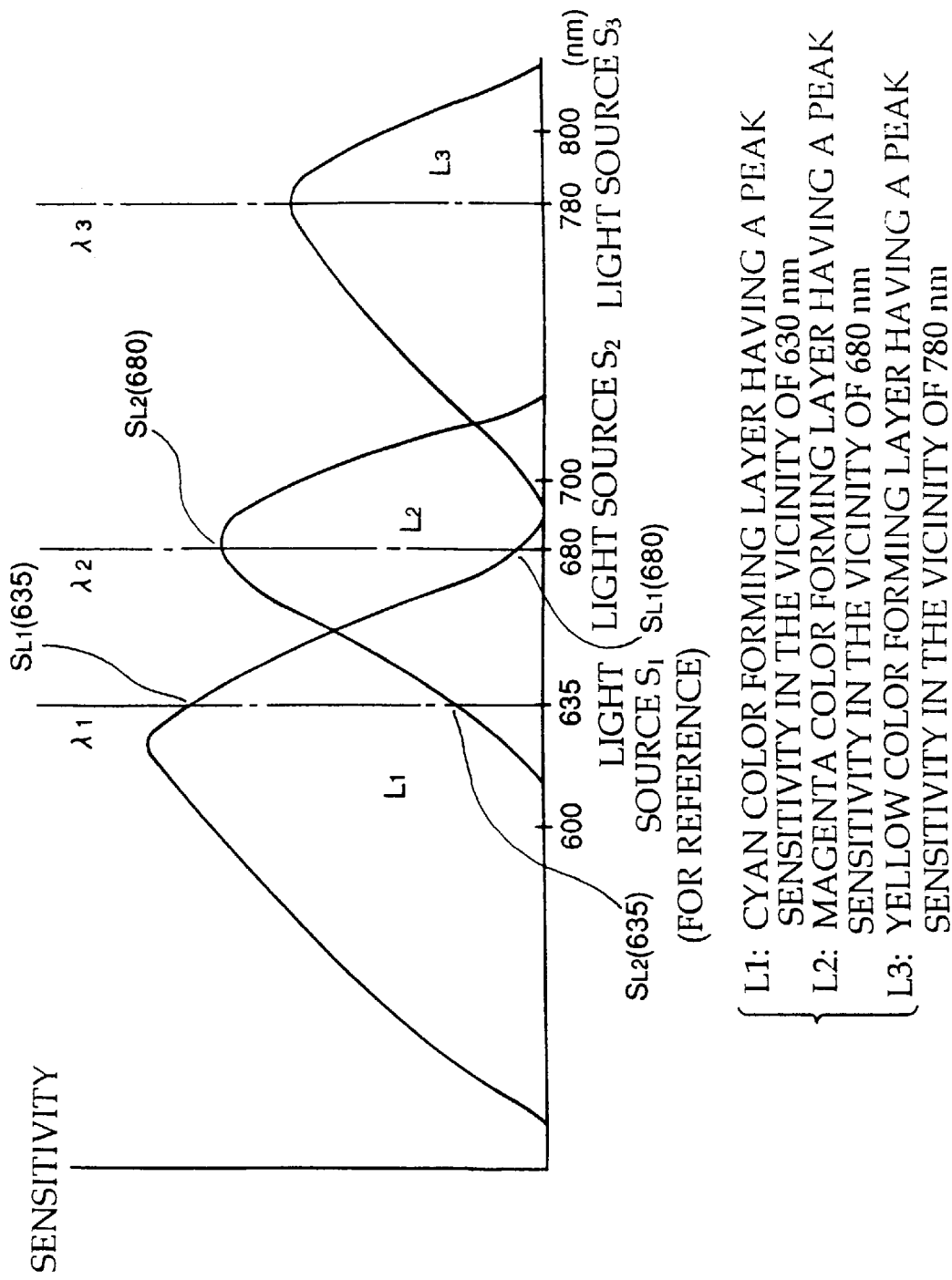

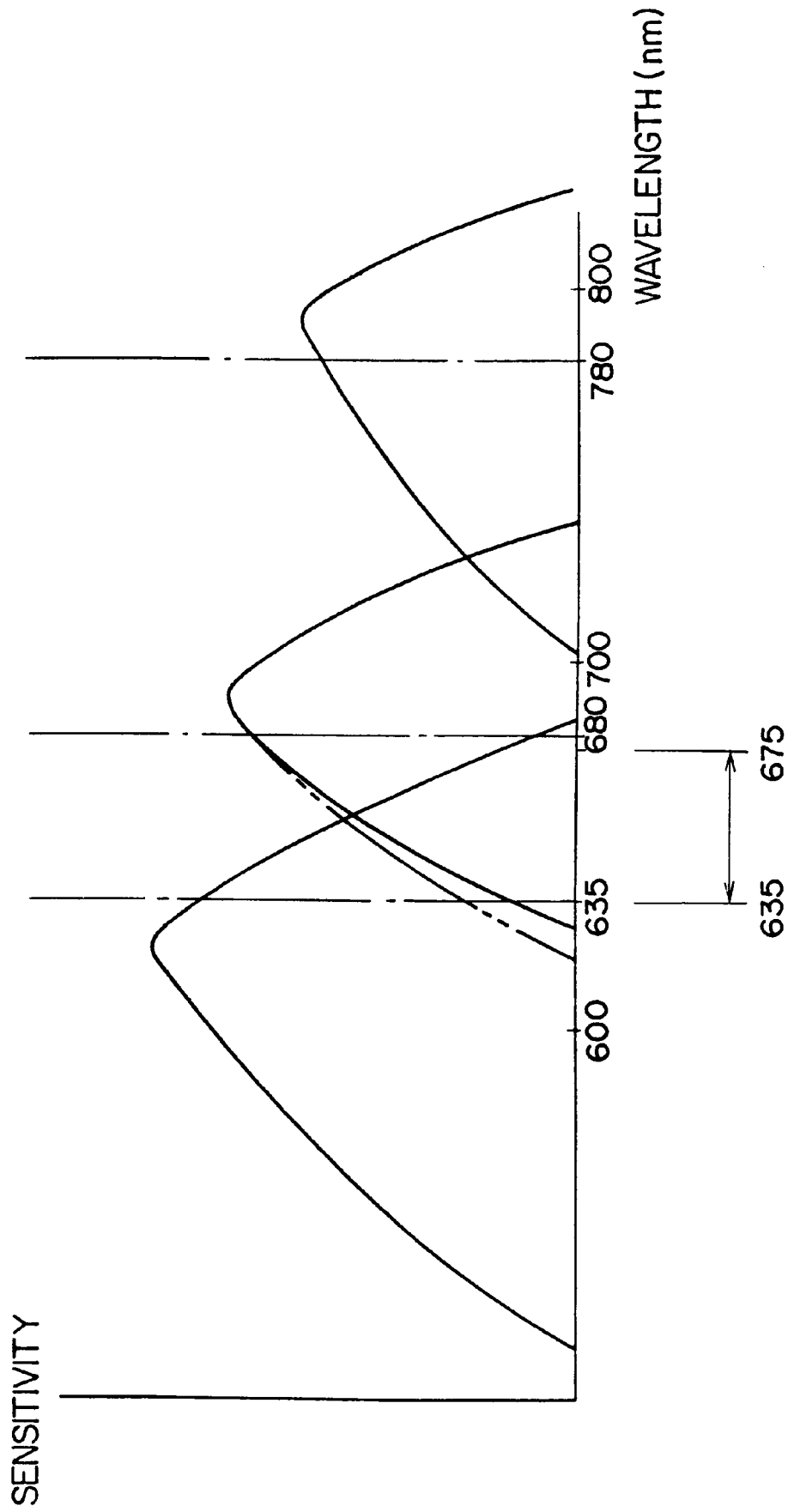

IMAGE EXPOSING DEVICE

BACKGROUND OF THE INVENTION

1. Field of the Invention

The present invention relates to an image exposing device which, on the basis of image data, modulates light beams output from three light sources having respectively different wavelengths, and scans-exposes a photosensitive material.

2. Description of the Related Art

Conventionally, in an image exposing device which exposes an image while scanning on a photosensitive material light beams of three different wavelengths output from semiconductor lasers, the wavelengths of the lights output from the semiconductor lasers and the spectral sensitivity characteristics of the photosensitive material which is used are set to match each other.

However, in a case in which a photosensitive material having special spectral sensitivity characteristics is used, semiconductor lasers matching the special spectral sensitivity characteristics must be used. This leads to an increase in cost. Further, maintainability, e.g., the introduction of a new image exposing device, replacement, repair, and the like, deteriorates due to the use of semiconductor lasers which are not widely used. Moreover, the structure of the optical system becomes complex, and the assembly workability deteriorates.

Examples of semiconductor light sources which are widely used include semiconductor lasers which are used for reading CDs (compact discs) and have a light-emitting peak wavelength of around 78 nm, and semiconductor lasers which are used for reading DVDs (digital video discs) and have a light-emitting peak wavelength of around 635 nm.

Examples of widely-used semiconductor lasers which have been put into actual use include InGaP semiconductor lasers having a light-emitting peak wavelength in a vicinity of 670 nm, InGaAsP semiconductor lasers having a light-emitting peak wavelength in a vicinity of 690 nm, and semiconductor lasers having light-emitting peak wavelengths in a range of 670 nm to 710 nm.

SUMMARY OF THE INVENTION

In view of the aforementioned, an object of the present invention is to provide an image exposing device which uses widely-used semiconductor light sources to expose images onto photosensitive materials having spectral sensitivity characteristics corresponding to the widely-used semiconductor light sources, so as to record high-quality color images in which there is no color mingling.

A first aspect of the present invention is an image exposing device which, on the basis of image data, modulates light beams outputted from three light sources having respectively different wavelengths, and which scans/exposes the light beams onto a photosensitive material, wherein the three light sources are a light source S1 having a light-emitting peak wavelength in a vicinity of 635 nm, a light source S2 having a light-emitting peak wavelength in a range of 670 to 710 nm, and a light source S3 having a light-emitting peak wavelength in a vicinity of 780 nm; the photosensitive material comprises a first photosensitive layer L1 having a peak spectral sensitivity corresponding to the light source S1, a second photosensitive layer L2 having a peak spectral sensitivity corresponding to the light source S2, and a third photosensitive layer L3 having a peak spectral sensitivity corresponding to the light source S3; a sensitivity $SL1_{(635)}$ of the first photosensitive layer L1 with respect to the light source S1 is at least 15 times a sensitivity $SL2_{(635)}$ of the second photosensitive layer L2 with respect to the light source S1; and a sensitivity $SL2_{(670-710)}$ of the second photosensitive layer L2 with respect to the light source S2 is at least 15 times a sensitivity $SL1_{(670-710)}$ of the first photosensitive layer L1 with respect to the light source S2.

Usually, the wavelengths of light beams outputted from light sources are selected in accordance with the spectral sensitivity characteristics of the photosensitive material used. Therefore, when a special photosensitive material, which is not widely used, is utilized, the sensitivity peak wavelengths of the photosensitive material and the intensity peak wavelengths of the light sources do not coincide, and due to color mingling or the like, the desired colors cannot be sufficiently obtained. Therefore, it is necessary to produce light sources which match the spectral sensitivity characteristics of the photosensitive material, or to interpose a special filter in the optical system. Here, in accordance with the first aspect of the present invention, by adjusting the spectral sensitivity characteristics of the photosensitive material to match the wavelengths of the light beams outputted from the light sources, light sources which output light beams at widely-used wavelengths can be utilized, which leads to a decrease in costs, a simplification of the optical system, and an improvement in assembly workability and the like. Further, maintainability, such as introduction of new light sources, replacement, repair, and the like, can be improved.

The three light sources are formed by semiconductor lasers whose light-emitting peak wavelengths are widely used and are in the vicinity of 635 nm (S1), 670–710 nm (S2), and 780 nm (S3).

The first photosensitive layer L1 has a sensitivity ($SL1_{(635)}$) with respect to the light source S1. The light source S1 affects the second photosensitive layer L2 as well (sensitivity $SL2_{(635)}$). In order to suppress this effect, the sensitivity $SL1_{(635)}$ is at least 15 times the sensitivity $SL2_{(635)}$.

Further, the second photosensitive layer L2 has sensitivity ($SL2_{(670-710)}$) with respect to the light source S2. The light source S1 affects the first photosensitive layer L1 as well (sensitivity $SL1_{(670-710)}$). In order to suppress this effect, the sensitivity $SL2_{(670-710)}$ is at least 15 times the sensitivity $SL1_{(670-710)}$.

$$SL1_{(635)} - SL2_{(635)} > 1.2 \text{ (meaning 15 times)}$$

$$SL2_{(670-710)} - SL1_{(670-710)} > 1.2 \text{ (meaning 15 times)}$$

In this way, the effects of the adjacent light source can be suppressed, and deterioration of color reproduction due to color mingling can be prevented.

It is thought that semiconductors of 635 nm will be the most widely used from now on. Such semiconductor lasers are used in, for example, DVDs. Semiconductor lasers of 670–710 nm are widely used for pointers, light recording, bar code readers, and the like. Semiconductor lasers of 780 nm are currently the most widely used. By using these semiconductor lasers, even in cases in which replacement is needed, the semiconductor lasers can be obtained easily, which makes them the most ideal light sources.

In a second aspect of the present invention, a filter dye is included in the second photosensitive layer L2 such that the sensitivity $SL1_{(635)}$ of the first photosensitive layer L1 with respect to the light source S1 is at least 15 times the sensitivity $SL2_{(635)}$ of the second photosensitive layer L2 with respect to the light source S2.

By including a filter dye in the second photosensitive layer, spreading of the foot portions of the spectral sensitivity characteristics of the second photosensitive layer can be suppressed. By lowering the sensitivity $SL2_{(635)}$, the above condition that $SL1_{(635)}$ is 15 times greater than $SL2_{(635)}$ can be ensured.

BRIEF DESCRIPTION OF THE DRAWINGS

FIG. 2 is a graph illustrating the spectral sensitivity characteristics of a photosensitive material relating to the embodiment.

FIG. 3 is a graph illustrating the spectral sensitivity characteristics of a photosensitive material relating to a first variant example.

DESCRIPTION OF THE PREFERRED EMBODIMENTS

Figure 1:
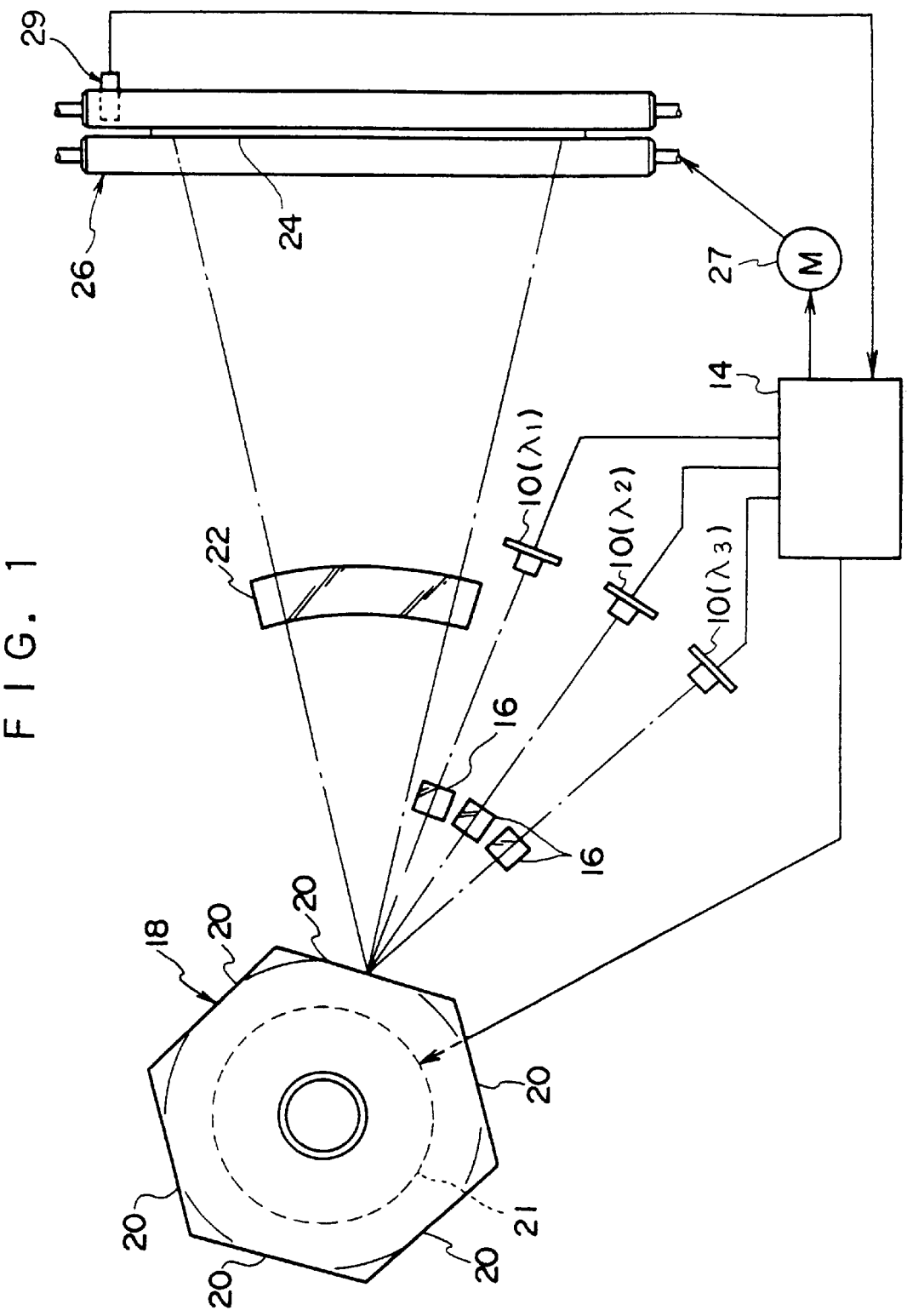
FIG. 1 is a schematic structural view of a scanning-exposing device relating to an embodiment of the present invention.

FIG. 1 illustrates a scanning-exposing device using three semiconductor lasers 10. The semiconductor lasers 10 are connected to a control device 14, output laser beams of predetermined wavelengths and predetermined light amounts, and are modulated on the basis of image data stored in a memory in the control device 14. The modulation is pulse width modulation, and the amount of exposure light illuminated onto a photosensitive material which will be described later is controlled by duty control. In the present embodiment, the peak wavelength λ1 of the first semiconductor laser 10 is 635 nm, the peak wavelength λ2 of the second semiconductor laser 10 is 670 nm, and the peak wavelength λ3 of the third semiconductor laser 10 is 780 nm.

Collective lenses 16 and a polygon mirror 18 are disposed at the downstream side of the semiconductor lasers 10. A plurality of planar mirrors 20 are provided at the outer circumference of the polygon mirror 18. The polygon mirror 18 is a planar deflector which is rotated at high speed by the driving of a motor 21 which is connected to the control device 14. The angles of incidence and angles of reflection, within one planar mirror, of the light beams outputted from the semiconductor lasers 10 are successively changed due to the rotation of the polygon mirror 18, and the reflected light beams move linearly (main scanning). The main scanning is carried out successively by the respective planar mirrors 20.

The light beams reflected by the planar mirrors 20 of the polygon mirror 18 reach, via an fθ lens 22, a photosensitive material 24 which is disposed planarly.

The photosensitive material 24 is nipped by a plurality of pairs of rollers 26 (only one pair is illustrated in FIG. 1) whose axes are the main scanning direction. The rollers 26 are rotated at a uniform speed by the driving force of a motor 27 connected to the control device 14. In this way, the photosensitive material 24 moves at a uniform speed in a direction orthogonal to the main scanning direction (subscanning).

In this structure, an image can be exposed by scanning, on the photosensitive material 24, light beams modulated on the basis of image data stored in a memory within the control device 14. A start signal detecting sensor 29 is disposed so as to correspond to the leading side of the line which scanned by the light beam. The output timing of the image data is obtained by the start signal detecting sensor 29 detecting the light of the light beam. In actuality, modulation begins after a predetermined period of time has elapsed from the detection of light by the start signal detecting sensor 29.

The spectral sensitivity characteristics of the photosensitive material 24 are determined in accordance with the output wavelengths (peak wavelengths) of the semiconductor lasers 10 which are used. In the present embodiment, the peak wavelengths of the semiconductor lasers 10 are as follows: λ1 is 635 nm, λ2 is 670 nm, and λ3 is 780 nm. In accordance therewith, the photosensitive material 24 has spectral sensitivity characteristics such as those illustrated in FIG. 2.

The color forming layers of the respective dyes (CMY) of the photosensitive material 24 having such characteristics have the following compositions. The compositions of the color forming layers disclosed in Japanese Patent Application Laid-Open (JP-A) No. 7-219185 are modified and used herein as the basic color forming layers.

The first layer L1 is a C (cyan) color forming layer having a peak sensitivity in a vicinity of a wavelength of 630 nm. A composition in which sensitizing dyes (2), (3), which are added to a silver halide emulsion (2) used in the third layer (the 750 nm photosensitive layer) in paragraph 0187 of page 32 of JP-A-7-219185, are changed to the following structure is used in the first layer L1.

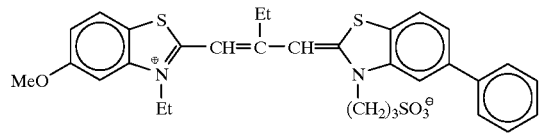

The second layer L2 is an M (magenta) color forming layer having a peak sensitivity in a vicinity of a wavelength of 670 nm. The silver halide emulsion (1) for the fifth layer (the 670 nm photosensitive layer) disclosed in paragraph 0176 of page 31 of JP-A-7-219185 is used in the second layer L2.

The third layer L3 is a Y (yellow) color forming layer having a peak sensitivity in a vicinity of a wavelength of 780 nm. A composition in which the added dye (4), which is used in the silver halide emulsion (3) used in the first layer (the 810 nm photosensitive layer) in paragraph 0196 of page 34 of JP-A-219185, is changed to the following structure is used in the third layer L3.

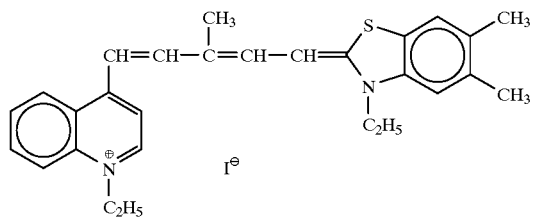

The added amount of the sensitizing dye is an optimal amount such that the sensitivity becomes as high as possible.

Operation of the present embodiment will be described hereinafter.

When image data is recorded in the memory of the control device 14, scanning-exposing onto the photosensitive material 24 begins on the basis of the image data.

While the polygon mirror 18 is rotating at high speed, the plural pairs of rollers 26 are driven to rotate, the photosensitive material 24 is fed to the scanning-exposing position, and the light beams are outputted from the semiconductor lasers 10. This movement of the photosensitive material 24 is subscanning, and the photosensitive material 24 is moved at a uniform speed. Here, due to the detection of the light beams by the start signal detecting sensor 29, the start of the main scan is recognized. After a predetermined period of time, when it is confirmed that it is the start of exposure position, the light beams from the semiconductor lasers 10 are modulated on the basis of the image data.

At the control device 14, first, the light beam from the first semiconductor laser 10, which first reaches the image recording region of the photosensitive material 24, is modulated. Due to this modulation, a C dye image is exposed onto the photosensitive material 24.

Next, after scanning-exposing by the first semiconductor laser 10 has been completed, the second semiconductor laser 10 (whose angle of incidence is greater than that of the first semiconductor laser 10) reaches the image recording region. At the control device 14, the light beam from the second semiconductor laser 10 is modulated. Due to this modulation, an M dye image is exposed onto the photosensitive material 24.

Similarly, after scanning-exposing by the second semiconductor laser 10 has been completed, the third semiconductor laser 10 (whose angle of incidence is the greatest) reaches the image recording region. At the control device 14, the light beam from the third semiconductor laser 10 is modulated. Due to this modulation, a Y dye image is exposed onto the photosensitive material 24.

In accordance with the present embodiment, widely-used semiconductor lasers 10 are used. Therefore, for example, when broken parts are to be replaced, new parts can be obtained quickly, and maintainability improves.

The reason why widely-used semiconductor lasers 10 can be used is that the spectral sensitivity characteristics of the photosensitive material 24 are composed so as to match the semiconductor lasers 10. However, as shown by the chain lines in FIG. 2, when the peak sensitivities of the spectral sensitivity distributions match the peak wavelengths of the semiconductor lasers 10, the foot portions of the spectral sensitivity distributions of wavelengths of 635 nm and 670 nm overlap to a great extent, and color mingling becomes a concern. Here, as illustrated by the solid lines in FIG. 2, the peak wavelength of the spectral sensitivity distribution of the photosensitive material 24 corresponding to the wavelength of 635 nm is shifted further toward the short wavelength side than the peak wavelength 635 nm of the semiconductor laser 10, and the peak wavelengths of the spectral sensitivity distributions of the photosensitive material 24 corresponding to the wavelengths of 670 nm and 780 nm are shifted further toward the long wavelength sides of the peak wavelengths 670 nm and 780 nm of the semiconductor lasers 10. In this way, a reduction of the overlapping portions can be achieved.

In the present embodiment, in order to prevent color mingling, the spectral sensitivity distributions are shifted. However, a variant example will be described hereinafter in which color mingling is prevented by adjusting the spectral sensitivity distributions of the photosensitive material 24. Here, the structure of the device (including the peak wavelengths of the semiconductor lasers 10) is the same as that of the above-described embodiment, and therefore, description thereof will be omitted.

Variant Example 1

FIG. 3 illustrates an example in which, in a case in which the sensitivity of the second photosensitive layer L2 in the photosensitive material is high on the whole and color differentiation is poor, there is included in the second photosensitive layer a filter dye which absorbs light in the infrared region.

More specifically, a non-diffusible filter dye can be included in order to improve sharpness and color differentiation and the like. A filter dye which absorbs light in the infrared region can be used as needed.

Details of non-diffusible filter dyes which have extremely high infrared region wavelength absorption values and which are preferably used in the present invention are disclosed in JP-A-4-31854, JP-A-4-217243, JP-A-4-276744, and JP-A-5-45834. Among the filter dyes disclosed in there publications, a particularly preferably used filter dye is the filter dye represented by following formula (S).

Formula (S)

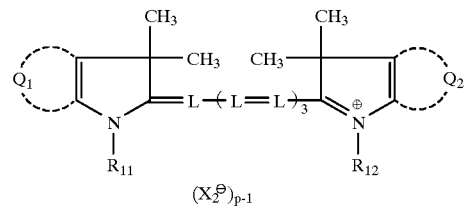

Here, $R_{11}$ and $R_{12}$ may be the same or different, and may be substituted by an alkyl group. Examples of substitutents are alkoxy group, phenoxy group and the like. Specific examples of substitutents include ethoxy group, 2,5-diazo fused ring, and naphtho fused ring. L represents a methine group, and is 1 when forming a salt in the molecule. A specific example of the filter dye represented by formula (S) is the compound shown below. However, it is to be noted that the present invention is not limited to use of this compound.

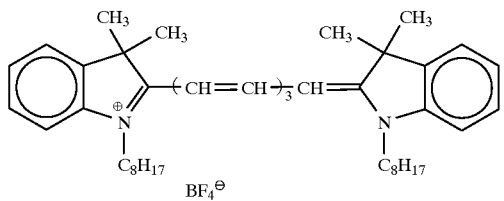

As described above, in the present embodiment, widely-used semiconductor lasers 10 are used, the spectral sensitivity distributions of the photosensitive material are set to match the semiconductor lasers 10, and the spectral sensitivity distributions are adjusted in order to prevent color mingling. Therefore, there is no need to use semiconductor lasers having special peak wavelengths. Further, because there is no need to use a special filter or the like in the optical system, the structure of the device can be simplified. Moreover, if there is trouble with the semiconductor lasers 10 and replacement or the like is necessary, parts for replacement can be obtained quickly, and maintainability is thereby improved.

As described above, the image exposing device relating to the present invention has a superior effect in that, by using widely-used semiconductor light sources, an image can be exposed onto a photosensitive material having spectral sensitivity characteristics which correspond to the semiconductor light sources, and quality color images having little color mingling can be recorded.

What is claimed is:

1. An image exposing device which, based on image data, modulates light beams outputted from light sources having respectively different wavelengths said image exposing device comprising:

a first light source having a light-emitting peak wavelength in a vicinity of 635 nm;

a second light source having a light-emitting peak wavelength in a range of 670 to 710 nm a third light source having a light-emitting peak wavelength in a vicinity of 780 nm; and a photosensitive material onto which the first, second and third light sources are scanned, the photosensitive material comprising a first photosensitive layer having a peak spectral sensitivity corresponding to the first light source, a second photosensitive layer having a peak spectral sensitivity corresponding to the second light source, and a third photosensitive layer having a peak spectral sensitivity corresponding to the third light source, wherein a sensitivity of the first photosensitive layer with respect to the first light source is at least fifteen times a sensitivity of the second photosensitive layer with respect to the first light source, and a sensitivity of the second photosensitive layer with respect to the second light source is at least fifteen times a sensitivity of the first photosensitive layer with respect to the second light source.

2. An image exposing device according to claim 1, wherein the second photosensitive layer includes a filter dye so that the sensitivity of the first photosensitive layer with respect to the first light source is at least fifteen times the sensitivity of the second photosensitive layer with respect to the second light source.

3. An image exposing device according to claim 1, wherein the light-emitting peak wavelength of the second light source is 670 nm.

4. An image exposing device according to claim 1, wherein the first, second and third light sources are semiconductor lasers.

5. An image exposing device comprising:

a first light source having a light-emitting peak wavelength of 635 nm, a second light source having a light-emitting peak wavelength in a range of 670 nm to 710 nm;

a third light source having a light-emitting peak wavelength in of 780 nm;

a deflecting means upon which light beams from said first, second and third light sources which are modulated on according to image data, are incident, said deflecting means reflecting the incident light beams to expose a photosensitive material, wherein the photosensitive material comprises a first photosensitive layer having a peak spectral sensitivity corresponding to said first light source having a peak spectral sensitivity corresponding to said second light source, and a third photosensitive layer having a peak spectral sensitivity corresponding to said third light source, and wherein a sensitivity of the first photosensitive layer with respect to said first light source is at least fifteen times a sensitivity of the second photosensitive layer with respect to said first light source, and a sensitivity of the second photosensitive layer with respect to said second light source is at least fifteen times a sensitivity of the first photosensitive layer with respect to said second light source.

6. An image exposing device according to claim 5, wherein the second photosensitive layer includes a filter dye so that the sensitivity of the first photosensitive layer with respect to said first light source is at least fifteen times the sensitivity of the second photosensitive layer with respect to said second light source.

7. An image exposing device according to claim 5, wherein the light-emitting peak wavelength of said second light source is 670 nm.

8. An image exposing device according to claim 5, wherein said first, second and third light sources are semiconductor lasers.

* * * * *